United States Patent
Tregenza Dancer

(10) Patent No.: US 9,877,087 B2
(45) Date of Patent: *Jan. 23, 2018

(54) TELEPHONY EQUIPMENT MIGRATION

(71) Applicant: METASWITCH NETWORKS LTD, Enfield (GB)

(72) Inventor: Colin Tregenza Dancer, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,877

(22) Filed: Mar. 8, 2016

(65) Prior Publication Data

US 2016/0192038 A1    Jun. 30, 2016

Related U.S. Application Data

(63) Continuation of application No. 13/530,752, filed on Jun. 22, 2012, now Pat. No. 9,319,529.

(51) Int. Cl.
*H04M 7/00* (2006.01)
*H04Q 3/00* (2006.01)
(Continued)

(52) U.S. Cl.
CPC ....... *H04Q 3/0062* (2013.01); *H04L 12/6418* (2013.01); *H04M 3/2254* (2013.01);
(Continued)

(58) Field of Classification Search
USPC .......... 379/224, 15.01, 15.02, 16, 22, 26.01, 379/310, 311
See application file for complete search history.

(56) References Cited

U.S. PATENT DOCUMENTS

2004/0234043 A1    11/2004  Argo
2007/0217403 A1*   9/2007   Horner .................... H04L 45/00
                                                      370/360
(Continued)

FOREIGN PATENT DOCUMENTS

EP    2197188 A2    6/2010

OTHER PUBLICATIONS

NPL Document dated Oct. 2007 "DS3 Fail-over (DS3 Protection) switch" Valiant communications Limited.*

(Continued)

*Primary Examiner* — Yosef K Laekemariam
(74) *Attorney, Agent, or Firm* — EIP US LLP

(57) ABSTRACT

A telephony equipment migration arrangement is provided. The telephony equipment migration arrangement includes legacy telephony equipment located in one or more equipment bays, at least one transport cable, with one or more connectors, to provide external carrier connectivity, replacement telephony equipment located in one or more equipment bays remote from the legacy telephony equipment, and at least one remote coupling cable, with one or more connectors, connected to the replacement telephony equipment. The connector(s) of the remote coupling cable are mounted in a location having a predetermined locational relationship with the equipment bay in which the legacy telephony equipment is located, and the transport cable is communicatively coupled to the remote coupling cable.

24 Claims, 8 Drawing Sheets

(51) Int. Cl.
    *H04M 3/22*    (2006.01)
    *H04M 5/08*    (2006.01)
    *H04M 3/32*    (2006.01)
    *H04L 12/64*   (2006.01)

(52) U.S. Cl.
    CPC .............. *H04M 3/32* (2013.01); *H04M 5/08* (2013.01); *H04M 7/0087* (2013.01); *H04Q 3/0083* (2013.01); *H04Q 2213/13342* (2013.01); *H04Q 2213/34* (2013.01)

(56) References Cited

U.S. PATENT DOCUMENTS

| | | |
|---|---|---|
| 2008/0159273 A1 | 7/2008 | Brugman |
| 2010/0017532 A1 | 1/2010 | Bowen |
| 2010/0157516 A1* | 6/2010 | Doorhy .............. H04L 41/0806 361/679.02 |

OTHER PUBLICATIONS

Valiant Communications Limited DS3 Failover (DS3 Protection) Product Brochure and Data Sheet Oct. 2007.

* cited by examiner

TELEPHONY EQUIPMENT MIGRATION

CROSS-REFERENCE TO RELATED APPLICATIONS

This application is a continuation of U.S. application Ser. No. 13/530,752, filed on Jun. 22, 2012. The above-referenced patent application is incorporated by reference in its entirety.

TECHNICAL FIELD

The present invention relates to a telephony equipment migration arrangement, a method of migrating telephony equipment and a telephony equipment migration module.

BACKGROUND

Cabling records are used extensively to document the physical locations of cabling connections in environments in which it is important to be able to identify such locations accurately. For example, cabling records are often used to map the cabling connections in rooms or buildings that house telecommunications equipment such as, but not limited to, telephony switching equipment. The exact format of cabling records varies from carrier to carrier. A typical cabling record may be indexed by a circuit identifier, which represents an end-to-end high-level identifier. The cabling record lists the physical location of the termination points at either end of the cable (for example using a grid-based identifier), equipment information associated with equipment at each end of the cable, for example 'port 57' on 'switch 2', and routing information, for example which trays the cable is run in and the like. In the event of a connection failure, for example, it is important to be able to determine the physical location of the associated connection so that it can be inspected as quickly as possible. Accurate knowledge of the physical location of such connections is also important for less time-critical work such as upgrades or maintenance.

Cabling records are usually updated manually in that an engineer has to record changes in the physical location of connections in a cabling record, which often leads to inaccuracies as a result of human error, particularly where large numbers of cables are being moved. Cabling record errors and/or omissions can have serious consequences if the physical location of a given connection cannot accurately be determined, for example in the event of a failure of the connection. In some situations, this may result in loss of service for end users.

When looking to upgrade from existing, legacy telephony equipment, which can occupy many tens of equipment bays, to newer, replacement telephony equipment, questions arise as to how to migrate the old telephony equipment to the new telephony equipment; both in terms of migrating carriers from the old telephony equipment to the new telephony equipment and in terms of reducing the risk of cabling record errors and/or omissions when migrating the carriers.

In some cases, the new telephony equipment has to be run in parallel with the old telephony equipment and the circuits migrated over one at a time by rerouting the individual physical carriers and updating the telephony equipment configuration so that the rest of the network knows that the circuits have been moved to the new switch. This involves a number of expensive and time-consuming steps. Moving the large number of carriers involves much skilful and time-consuming rewiring, with great potential for error. Updating all of the per-carrier wiring records is also time-consuming and error prone. Furthermore, to allow both the new and old telephony equipment to run in parallel during the migration, the rest of the network needs to be reconfigured to see both the new and old telephony equipment, potentially with extra signalling links and the like.

In other cases, the carriers are already routed through a fully flexible transport system with the ability to route carriers to a number of destinations on the basis of a simple change to soft configuration and enough spare capacity to connect to both the replacement telephony equipment as well as the legacy telephony equipment. In that case, new links can be run from the transport system to the new telephony equipment during a preparatory phase, with the old telephony equipment still active and carrying all of the live traffic. Just before the switchover, configuration is exported from the old telephony equipment and is migrated into the new telephony equipment. Then, at some point during a maintenance window, the transport system can be used to cut all of the traffic from the old telephony equipment to the new telephony equipment. The use of this sudden cut is important as it avoids the need for the old and new telephony equipment both to be visible to the rest of the network. However, spare transport capacity is often not available and even when it is, the wiring record updates required for every carrier carries a heavy cost.

It would therefore be desirable to provide improvements in migrating telephony equipment, particularly but not exclusively, which reduce the risk of inaccuracies in updates to cabling records following telephony equipment migration.

SUMMARY

In accordance with an aspect of the invention, there is provided a telephony equipment migration arrangement comprising:

legacy telephony equipment located in one or more equipment bays including at least a first equipment bay;

at least one transport cable having one or more connectors, the at least one transport cable providing external carrier connectivity;

replacement telephony equipment located in one or more equipment bays remote from the legacy telephony equipment; and at least one remote coupling cable connected to the replacement telephony equipment and comprising one or more connectors, wherein the one or more connectors of the remote coupling cable are mounted in a location having a predetermined locational relationship with the first equipment bay in which the legacy telephony equipment is located, and, wherein the at least one transport cable is communicatively coupled to the at least one remote coupling cable.

Telephony equipment migration may be improved in this way by logically extending the interfaces of the replacement telephony equipment in this way, the replacement telephony equipment can be considered a drop-in replacement for the legacy telephony equipment and the need to update the transport cable records may be avoided.

In some embodiments, the telephony equipment migration arrangement comprises at least one telephony equipment migration module via which the at least one transport cable and the at least one remote coupling cable are communicatively couplable, the at least one telephony equipment migration module comprising:

one or more transport cable connectors that are communicatively couplable to the one or more connectors of the at least one transport cable; and one or more replacement telephony equipment connectors that are communicatively couplable to the one or more connectors of the at least one remote coupling cable.

In some embodiments, the at least one telephony equipment migration module is located in one or more equipment bays in a location having a predetermined locational relationship with the first equipment bay in which the legacy telephony equipment is located.

In some embodiments, the one or more replacement telephony equipment connectors are for transmitting transport signals to and receiving transport signals from the replacement telephony equipment and the at least one telephony equipment migration module comprises:

one or more legacy telephony equipment connectors for transmitting transport signals to and receiving transport signals from the legacy telephony equipment;

one or more controllers operable to control switching between:
transport signals being transmitted to the legacy telephony equipment or transport signals being transmitted to the replacement telephony equipment; and
transport signals being received from the legacy telephony equipment or transport signals being received from the replacement telephony equipment.

In some embodiments, the one or more controllers are configured to default to transport signals being transmitted to the legacy telephony equipment and transport signals being received from the legacy telephony equipment.

In some embodiments, the at least one telephony equipment migration module comprises:

one or more relays that are controllable to switch between transport signals being transmitted to the legacy telephony equipment or transport signals being transmitted to the replacement telephony equipment; and one or more relays that are controllable to switch between transport signals being received from the legacy telephony equipment or transport signals being received from the replacement telephony equipment.

In some embodiments, at least some of the one or more relays comprise latching relays.

In some embodiments, the at least one telephony equipment migration module comprises one or more transport cable connectors that are directly connectable to the one or more connectors of the at least one transport cable.

In some embodiments, the at least one telephony equipment migration module comprises one or more transport cable connectors that are not directly connectable to the one or more connectors of the at least one transport cable, and the arrangement comprises:

one or more adaptors comprising:
one or more transport cable connectors that are directly connected to the one or more connectors of the at least one transport cable; and
one or more connectors that are directly connectable to the one or more transport cable connectors of the at least one telephony equipment migration module and are directly connectable to the one or more connectors of the at least one remote coupling cable,
wherein the at least one transport cable is indirectly connectable to the at least one telephony equipment migration module via the one or more adaptors.

In some embodiments, the at least one telephony equipment migration module comprises one or more replacement telephony equipment connectors that are directly connectable to the one or more connectors of the at least remote coupling cable.

Some embodiments comprise one or more telephony equipment migration module mounts, the one or more telephony equipment migration module mounts being securable to a rack in which the first equipment bay is located and to the at least one telephony equipment migration module.

In some embodiments, the one or more connectors of the at least one remote coupling cable are directly connectable to the one or more connectors of the at least one transport cable.

In some embodiments, the predetermined locational relationship comprises the one or more connectors of the remote coupling cable being mounted in a location in the vicinity of the first equipment bay.

In some embodiments, the predetermined locational relationship comprises the one or more connectors of the remote coupling cable being mounted in the location of the first equipment bay.

In some embodiments, the at least one transport cable is communicatively coupled to the legacy telephony equipment.

In some embodiments, the replacement telephony equipment comprises a new generation telephony equipment which supersedes the legacy telephony equipment.

In some embodiments, the legacy telephony equipment comprises one or more legacy telephony switches and wherein the replacement telephony equipment comprises one or more replacement telephony switches.

According to a further aspect of the invention, there is provided a method of migrating telephony equipment, comprising:

providing at least one telephony equipment migration module;

connecting at least one transport cable to the at least one telephony equipment migration module, the at least one transport cable providing external carrier connectivity;

connecting at least one coupling cable to the at least one telephony equipment migration module and to legacy telephony equipment;

connecting at least one coupling cable to the at least one telephony equipment migration module and to replacement telephony equipment, testing the replacement telephony equipment using at least the at least one telephony equipment migration module; and activating the replacement telephony equipment.

Telephony equipment migration may be improved in this way by providing the telephony equipment migration module which is used to test the replacement switch and which may reduce the physical effort involved in communicatively coupling the at least one transport cable to the replacement telephony equipment.

Such embodiments facilitate telephony equipment migration by using the at least one telephony equipment migration module to test the replacement telephony equipment.

Some embodiments comprise activating the replacement telephony equipment via the telephony equipment migration module.

In some embodiments, the at least one telephony equipment migration module comprises:

one or more legacy telephony equipment connectors for transmitting transport signals to and receiving transport signals from the legacy telephony equipment;

one or more replacement telephony equipment connectors for transmitting transport signals to and receiving transport signals from the replacement telephony equipment; and one or more controllers operable to control switching between:

transport signals being transmitted to the legacy telephony equipment or transport signals being transmitted to the replacement telecommunication switch; and transport signals being received from the legacy telephony equipment or transport signals being received from the replacement telecommunication switch.

Some embodiments comprise operating the control module to switch from transport signals being received from the legacy telephony equipment to transport signals being received from the replacement telecommunication switch, while transport signals are being transmitted to the legacy telephony equipment.

Some embodiments comprise operating the control module to switch from transport signals being transmitted to the legacy telephony equipment to transport signals being transmitted to the replacement telecommunication switch, while transport signals are being received from the legacy telephony equipment.

Some embodiments comprise:

decoupling the at least one transport cable from the at least one telephony equipment migration module;

decoupling the at least one remote coupling cable from the at least one telephony equipment migration module; and communicatively coupling the at least one transport cable to the at least one remote coupling arrangement.

According to a further aspect of the invention, there is provided a telephony equipment migration module, comprising:

one or more transport cable connectors;

one or more legacy telephony equipment connectors for transmitting transport signals to and receiving transport signals from legacy telephony equipment;

one or more replacement telephony equipment connectors for transmitting transport signals to and receiving transport signals from replacement telephony equipment; and one or more controllers operable to control switching between:

transport signals being transmitted to the legacy telephony equipment or transport signals being transmitted to the replacement telecommunication switch; and transport signals being received from the legacy telephony equipment or transport signals being received from the replacement telecommunication switch.

Telephony equipment migration may be improved in this way by facilitating a more complete testing of individual connections prior to migration.

Further features and advantages of the invention will become apparent from the following description of preferred embodiments of the invention, given by way of example only, which is made with reference to the accompanying drawings.

DETAILED DESCRIPTION

Figure 1:
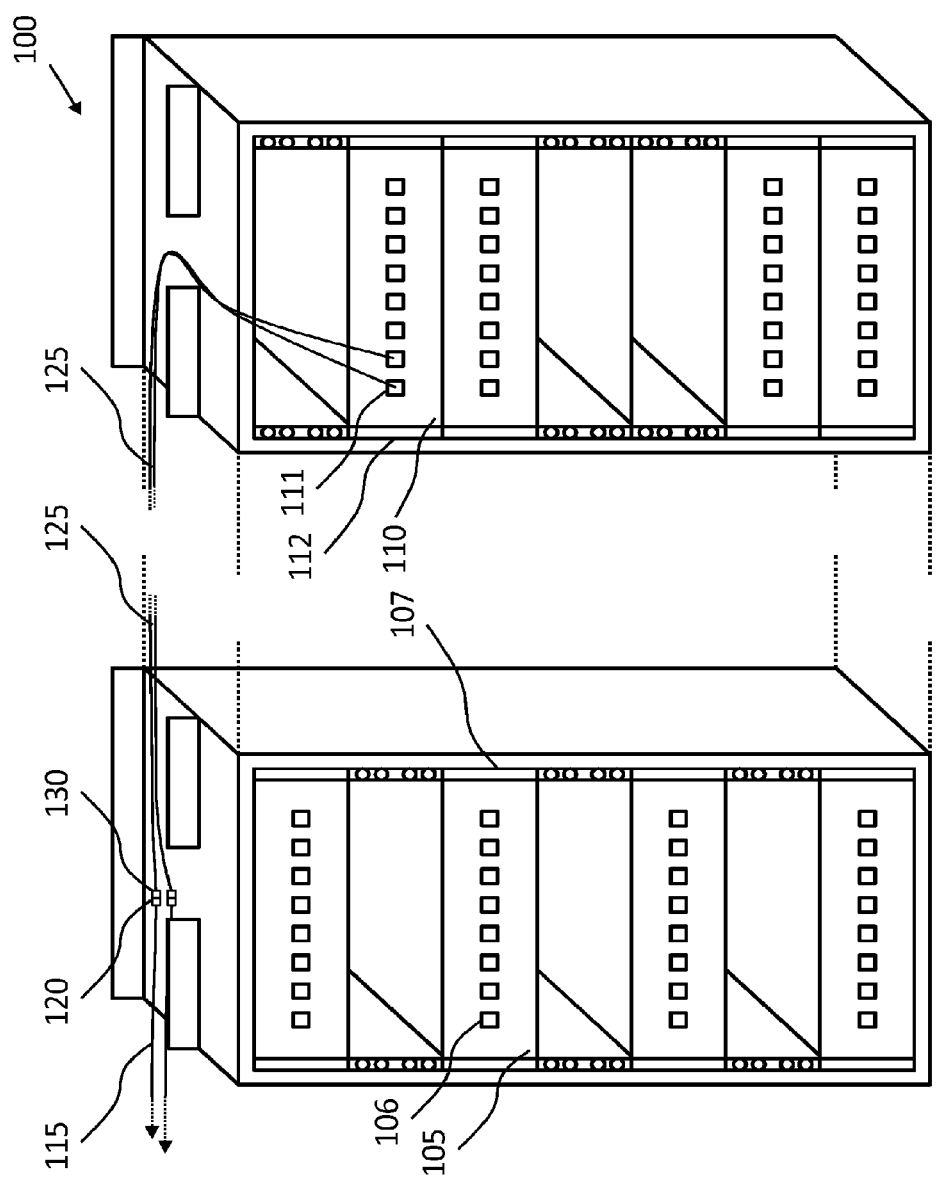
FIG. 1 is a perspective view of a telephony system that includes a telephony equipment migration arrangement in accordance with some embodiments.

FIG. 1 is a perspective view of a telephony system 100 that includes a telephony equipment migration arrangement in accordance with some embodiments.

The telephony equipment migration arrangement includes at least legacy telephony equipment 105 and replacement telephony equipment 110, for example legacy and replacement telephony switches. For example, the legacy telephony equipment 105 may be or may form part of a legacy CLASS 4 switch and the replacement telephony equipment 110 may be or may form part of new generation telephony equipment which supersedes the legacy telephony equipment 105. The telephony system 100 may include other telephony equipment, such as other telephony switches, that are not involved in the migration.

The legacy telephony equipment 105 and the replacement telephony equipment 110 support a number of copper-based Time-division Multiplexing (TDM) carriers, such as DS1, DS3 and the like. Some of the carriers are for access lines and some are for trunk use. The exact wiring used (for example twisted pair, coaxial or the like) differs according to the carrier type. However, these all have separate transmit and receive signals. These signals terminate at one or more transport cable connectors 106, 111 on the legacy telephony equipment 105 and the replacement telephony equipment 110 respectively.

For DS1 signals, the wiring used is often twisted pair, with a high-density connector such as RJ21/Telco50, Champ64 or Champ24 commonly used at the telephony equipment end. For DS3, coaxial cabling with BNC connectors may be used.

The telephony equipment migration arrangement includes legacy telephony equipment 105 that is located in one or more equipment bays, including at least a first equipment bay 107. In some cases, the legacy telephony equipment 105 takes up a single equipment bay and in other cases the legacy telephony equipment 105 takes up multiple equipment bays, potentially across multiple equipment racks and potentially spanning multiple rooms, floors or buildings. Other equipment may be located in other equipment bays in the racks in which the legacy telephony equipment 105 is located.

The telephony equipment migration arrangement includes at least one transport cable 115 having one or more connectors 120. The at least one transport cable 115 provides external carrier connectivity in the telephony system 100.

The replacement telephony equipment 110 is located in one or more equipment bays 112 remote from the legacy telephony equipment 105. Similarly to the legacy telephony equipment 105, the replacement telephony equipment 110 takes up a single equipment bay or takes up multiple equipment bays, potentially across multiple equipment racks. The replacement telephony equipment 110 may be located, for example, in a different room, floor or building from the legacy telephony equipment 105.

The telephony equipment migration arrangement includes at least one remote coupling cable 125 connected to the replacement telephony equipment 110 and comprising one or more connectors 130. In some embodiments, the at least one remote coupling cable 125 extends from the replacement telephony equipment 110 to the legacy telephony equipment 105.

The at least one transport cable 115 is communicatively coupled to the at least one remote coupling cable 125. As depicted in FIG. 1, connectors 120 of two transport cables 115 are coupled to corresponding connectors 130 of two remote coupling cables 125.

The one or more connectors 130 of the remote coupling cable 125 are mounted in a location having a predetermined locational relationship with the first equipment bay in which the legacy telephony equipment 105 is located.

In some embodiments, the predetermined locational relationship comprises the one or more connectors 130 of the remote coupling cable 125 being mounted in a location in the vicinity of the first equipment bay. In some embodiments, the predetermined locational relationship comprises the one or more connectors 130 of the remote coupling cable 125 being mounted in the location of the first equipment bay. As such, the remote coupling cable 125, which is sometimes referred to herein as a remoting cable, extends the connectors, for example female connectors, presented by the replacement telephony equipment 110 to one or more locations having a predetermined locational relationships with the first equipment bay in which the legacy telephony equipment 105 is located. The connectors 130 of the remote coupling cable 125 may be mounted above, to the side of, in front of, behind, or below the first equipment bay. The connectors 130 of the remote coupling cable 125 may be mounted in a spare bay in the rack in which the first equipment bay is located, for example above or below the first equipment bay, or above or below the rack, for example in a cable tray above the rack. This allows the replacement telephony equipment 110 logically to have its connectors in the same or close bays as the legacy telephony equipment 105 which, as will be explained below, minimises the need to change transport cable records as part of the migration. By extending the interfaces of the replacement telephony equipment 110 in this way, the replacement telephony equipment 110 can be considered a drop-in replacement for the legacy telephony equipment 105 and the need to update the transport cable records may be avoided.

In some embodiments, the connectors 130 of the remote coupling cable 125 are mounted in a spare bay in an adjacent rack in the vicinity of the first equipment bay. However, this may necessitate some updating of the cabling records, for example if the adjacent rack is associated with a different, for example grid-based, physical location identifier.

Figure 2:
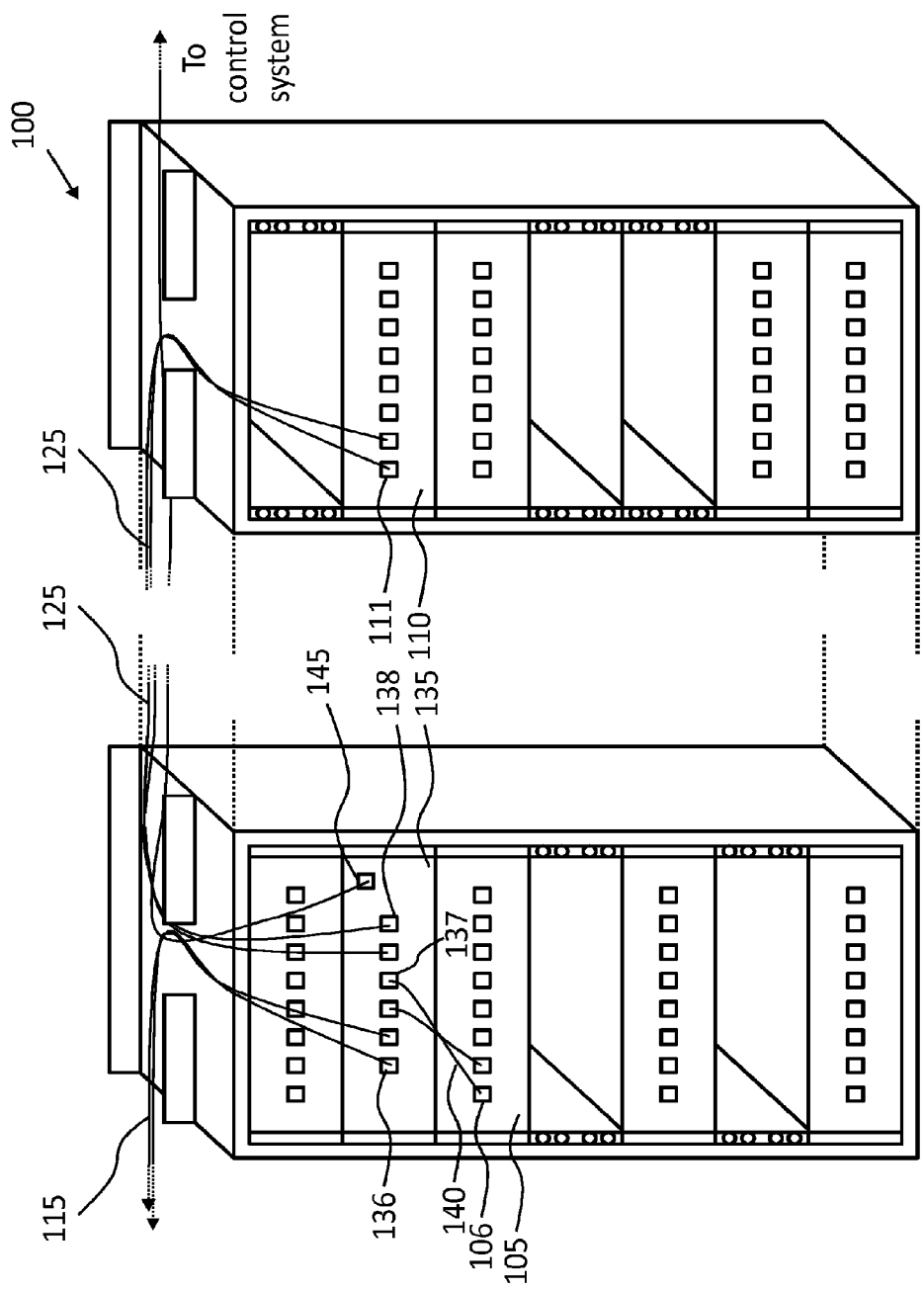
FIG. 2 is a perspective view of a telephony system including a telephony equipment migration arrangement which includes a telephony equipment migration module in accordance with some embodiments.

FIG. 2 is a perspective view of a telephony system 100 including a telephony equipment migration arrangement which includes a telephony equipment migration module in accordance with some embodiments.

In some embodiments, the telephony equipment migration arrangement comprises at least one telephony equipment migration module 135. In some embodiments, the at least one telephony equipment migration module 135 is located in one or more equipment bays in a location having a predetermined locational relationship with the first equipment bay in which the legacy telephony equipment 105 is located. The telephony equipment migration module 135 may take the form of a panel. The telephony equipment migration module 135 may be provided in various form-factors, for example 3 Rack Units (U) high at 23" spacing or 2 U high at 19" spacing. Other form-factors are possible.

The at least one transport cable 115 and the at least one remote coupling cable 125 are communicatively couplable via the telephony equipment migration module 135.

In some embodiments, the at least one telephony equipment migration module 135 comprises flanges via which the at least one telephony equipment migration module 135 is securable in the one or more equipment bays of the rack.

The telephony equipment migration module 135 includes three groups of connectors 136, 137, 138, having appropriate labels such as "Transport", "Legacy" and "Replacement".

The at least one telephony equipment migration module 135 comprises one or more transport cable connectors 136 that are communicatively couplable to the one or more connectors 120 of the at least one transport cable 115.

In some embodiments, the at least one telephony equipment migration module 135 comprises one or more transport cable connectors 136 that are directly connectable to the one or more connectors 120 of the at least one transport cable 115.

In some embodiments, the at least one telephony equipment migration module 135 comprises one or more transport cable connectors 136 that are not directly connectable to the one or more connectors 120 of the at least one transport cable 115. In such embodiments, the telephony equipment migration arrangement comprises one or more adaptors which may be provided in an appropriate form, such as in the form of one or more cables with appropriate connectors at each end.

For example, the one or more adaptors may comprise, at one end, one or more transport cable connectors that are directly connected to the one or more connectors 120 of the at least one transport cable 115 and, at the other end, one or more connectors that are directly connectable to the one or more transport cable connectors 136 of the at least one telephony equipment migration module 135. In some embodiments, the one or more connectors of the one or more adaptors that are directly connectable to the one or more transport cable connectors 136 of the at least one telephony equipment migration module 135 can also be directly connected to the one or more connectors 130 of the at least one remote coupling cable 125 (after they have been disconnected from the one or more transport cable connectors 136). The at least one transport cable 115 is thereby indirectly connectable to the at least one telephony equipment migration module 135 via the one or more adaptors.

The telephony equipment migration module 135 also comprises one or more replacement telephony equipment connectors 138 that are communicatively couplable to the one or more connectors 130 of the at least one remote coupling cable 125. The one or more replacement telephony equipment connectors 138 are for transmitting transport signals to and receiving transport signals from the replacement telephony equipment 110 via the at least one remote coupling cable 125.

In some embodiments, the replacement telephony equipment connectors 138, which may be standard connectors, on the telephony equipment migration module 135 are directly connectable to the connectors 130 of the remote coupling cable 125. For example, the replacement telephony equipment connectors 138 may be male connectors that are directly couplable to corresponding female connectors 130 of the remote coupling cable 125.

In some embodiments, the replacement telephony equipment connectors 138 are not directly connectable to the connectors 130 of the remote coupling cable 125. In such embodiments, adaptors, such as a set of gender-changer cables, may be provided to allow the (for example, female) connectors 130 on the remote coupling cable 125 to be connected to the (for example, female) replacement telephony equipment connectors 138 on the telephony equipment migration module 135.

In some embodiments, the telephony equipment migration module 135 comprises one or more legacy telephony equipment connectors 137 for transmitting transport signals to and receiving transport signals from the legacy telephony equipment 105. In some embodiments, the at least one transport cable 115 is communicatively coupled to the legacy telephony equipment 105 via the telephony equipment migration module 135, for example via one or more coupling cables 140.

The one or more legacy telephony equipment connectors 137 on the telephony equipment migration module 135, which may be industry-standard connectors, may be connected to, most likely different, connectors 106 on the legacy telephony equipment 105 using one or more adaptors. Multiple types of legacy telephony equipment 105 are therefore supported by, or couplable with, a given telephony equipment migration module 135 by using different adaptors of appropriate types.

As explained above, adaptors may be needed to enable communicative coupling of different entities in the telephony system 100. Such adaptors may be in the form of coupling cables, which are also referred to herein as personality or adaptor cables. However, it will be appreciated that adaptors in non-cable from may also be used if appropriate.

In some embodiments, two sets of personality cable are used for migration.

One set of personality cables has connectors, for example female connectors, matching the connectors 106 on the legacy telephony equipment 105 at one end and has connectors, such as male connectors, which match the transport cable connectors 136 on the telephony equipment migration module 135 at the other end. Such personality cables are used to connect the transport cables 115 to the telephony equipment migration module 135.

Another set of personality cable has connectors, for example male connectors, matching the connectors 120 on the transport cables 115 at one end and has connectors, such as male connectors, that match the legacy telephony equipment connectors 137 on the telephony equipment migration module 135 at the other end. Such personality cables are used to connect the legacy telephony equipment 105 to the telephony equipment migration module 135.

The personality cables may be octopus cables that convert from a number of connectors, for example on the legacy telephony equipment 105, to a different number of connectors, for example on the telephony equipment migration module 135, when the number of carriers per connector at one end differs from the number of carriers per connector on the other end.

In some embodiments, the adaptors that allow the transport cables 115 to be connected to the telephony equipment migration module 135 are designed or selected so that the adaptors are also directly connectable to the connectors 130 of the remote coupling cables 125 (for example when the adaptors are disconnected from the telephony equipment migration module 135), so that they could form a running cable-cable join if they were first disconnected from the telephony equipment migration module 135. This can improve long term reliability and can minimise costs because the telephony equipment migration module 135 can be removed and reused to perform other migrations.

Thus, one or more telephony equipment migration modules 135 are provided at the interface between the one or more transport cables 115 and the legacy telephony equipment 105, with additional connections to the replacement telephony equipment 110 via the one or more remote coupling cables 125. The telephony equipment migration module 135 is designed to sit temporarily in the signal path to facilitate seamless migration. The insertion of the telephony equipment migration module 135 at the pre-existing interface on the legacy telephony equipment 105 both minimises physical effort involved in the migration and also minimises the room for error in relation to updating the transport cable records following migration.

In some embodiments, the at least one telephony equipment migration module 135 comprises one or more controllers operable to control switching between transport signals being transmitted to the legacy telephony equipment 105 or transport signals being transmitted to the replacement telephony equipment 110, and transport signals being received from the legacy telephony equipment 105 or transport signals being received from the replacement telephony equipment 110.

The telephony equipment migration modules 135 may include control circuits and relays, for example latching relays, to allow separate switching of the transport transmit and receive signals between corresponding legacy telephony equipment transmit and receive connectors 137 and corresponding replacement telephony equipment transmit and receive connectors 138.

The separate transmit and receive selection allows both easily reversible signal switching and also full testing of the individual carriers prior to the main cutover, for example under remote control. The use of relays allows testing of the connections to the legacy telephony equipment 105 and the replacement telephony equipment 110, followed by a quick and easily reversed switch of some or all of the carriers between the legacy telephony equipment 105 and the replacement telephony equipment 110 if required.

In some embodiments, the one or more controllers are configured to default to transport signals being transmitted to the legacy telephony equipment 105 and transport signals being received from the legacy telephony equipment 105. The telephony equipment migration module 135 thus comprises logic to default to a safe state in the absence of being instructed to the contrary.

In some embodiments, the at least one telephony equipment migration module 135 comprises one or more relays that are controllable to switch between transport signals being transmitted to the legacy telephony equipment 105 or transport signals being transmitted to the replacement telephony equipment 110, and one or more relays that are controllable to switch between transport signals being received from the legacy telephony equipment 105 or transport signals being received from the replacement telephony equipment 110. In some embodiments, at least some of the one or more relays comprise latching relays, which allow continued stable operation in the event of loss of power or connection. The latching relays may be high reliability, Bellcore-certified latching relays.

The at least one telephony equipment migration module 135 may also include a self-test function to allow off-line verification of the correct functioning of all the relays. In some embodiments, the telephony equipment migration module 135 includes a self-test port for fully testing the relay function of the telephony equipment migration module 135 using an external cable set. The telephony equipment migration module 135 may comprise built-in drivers for self-test of the relays.

The telephony equipment migration arrangement may comprise one or more control systems comprising one or more control servers to control the telephony equipment migration procedure. The control servers present a User Interface (UI) to migration engineers and are used to control the telephony equipment migration modules 135. The control servers may interrogate and control the legacy telephony equipment 105 and the replacement telephony equipment 110. The control servers have logic for integrating some or all of these steps to locate the telephony equipment migration modules 135 and test they have been correctly installed, test the wiring or connectivity to the legacy and replacement telephony equipment 110, manage the cutover from the legacy telephony equipment 105 to the replacement telephony equipment 110, and/or inventory the various parts of the telephony system 100.

The control server may take the form of one or more units that run the UI that is presented to staff or engineers carrying out the migration. The control server may run a general purpose Operating System (OS), for example Linux™, communicate with the telephony equipment migration module 135 over a control network (which may be an Ethernet, but could be another interface such as serial), communicate with the legacy telephony equipment 105 and the replacement telephony equipment 110, and present a control UI, for example as a web interface. The control server holds a mapping file containing the mapping between physical ports and carriers on the telephony equipment management interfaces. The mapping file contains a mapping from the physical ports and carriers as seen by the telephony equipment migration module 135, to the logical identifiers used on management interfaces to the legacy telephony equipment 105 and the replacement telephony equipment 110 so that the migration control software can manage the status of the given carriers during the migration and test process.

The precise way in which the management status of each carrier is accessed can vary between the different telephony equipment. For extensibility, telephony equipment-specific management code is provided in well-defined modules to allow easy changing for different telephony equipment systems. In other words, specific code can be contained in cleanly isolated modules so that core migration management code can be used unchanged, with customisation for the telephony equipment being in limited pieces of equipment-specific code.

The control servers coordinate operation of the telephony equipment migration modules 135 alongside higher-level legacy telephony equipment 105 and replacement telephony equipment 110 management state. The control servers may be provided in a single, separate unit that communicates with telephony equipment migration modules 135, for example using the Internet Protocol (IP), and with the legacy telephony equipment 105 and the replacement telephony equipment 110 over appropriate management interfaces. The control servers offer a fully automated test/cut/retest function for use at the point of actual migration.

The control system thus provides a centralised UI, mapping records and switch interfaces to allow full end-to-end testing of the remap, smooth, easily reversible cut-over.

The telephony equipment migration module 135 may be controlled and powered from a central network and power infrastructure, for example from one or more Power-over-Ethernet (PoE) switches. There are various such switches already available that may be suitable, for example the Cisco™ 3560X switch series, in particular but not exclusively the Cisco WS-C3560X-48P-L model with 2×440 W DC PSUs. Using existing switching hardware may be beneficial in terms of minimising new hardware development, to control the risks and costs associated with migration and to protect timescales. Such switches are ideally Network Equipment-Building System (NEBS)-compliant, have dual feed, redundant DC power supplies, at least 48 ports (so that only one or two switches may be required) and per-port DHCP so that the IP address of the telephony equipment migration module 135 is determined automatically by the port to which the control server is connected.

The telephony equipment migration module 135 may comprise one or more control and power interfaces 145 that may be common between different types of telephony equipment migration modules 135. The control and power interface 145 may be designed so as to offer flexibility and ease of integration, possible using industry standard connectors where possible. The telephony equipment migration module 135 may require very little power (for example less than 1 W), so combining power and control cables may be beneficial. The control interface 145 may be of a plug-and-go type so that minimal configuration is required.

Figure 3:
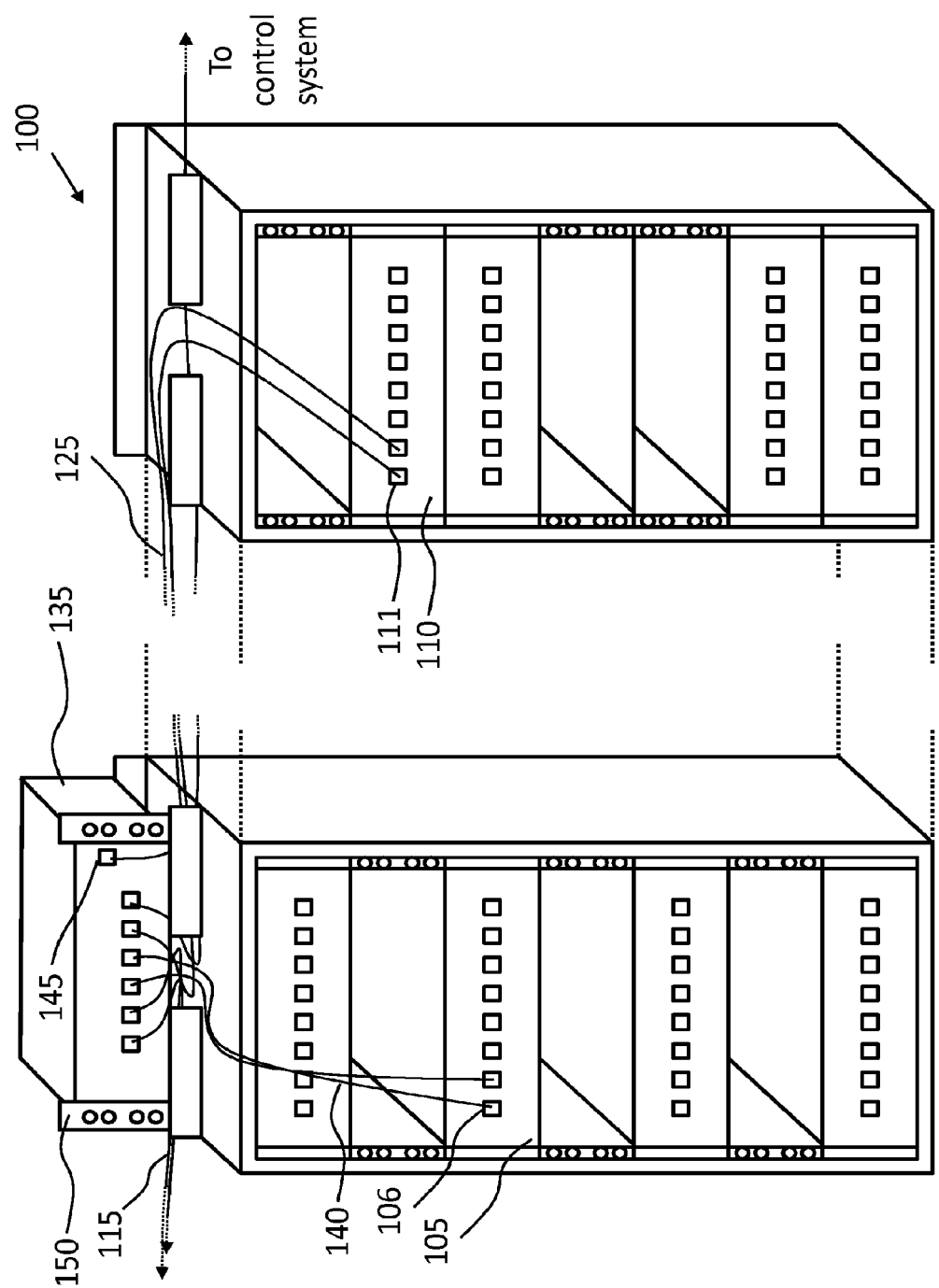
FIG. 3 is a perspective view of a telephony system that includes a telephony equipment migration arrangement which includes a telephony equipment migration module in accordance with some embodiments.

FIG. 3 is a perspective view of a telephony system 100 that includes a telephony equipment migration arrangement which includes a telephony equipment migration module in accordance with some embodiments.

In some embodiments, the at least one telephony equipment migration arrangement comprises one or more support arrangements or telephony equipment migration mounts 150 via which the at least one telephony equipment migration module 135 is indirectly securable to an equipment rack in which the first equipment bay is located.

The telephony equipment migration module 135 may be mounted in spare space in the racks or bays of the legacy telephony equipment 105, or mounted on cable trays above or below the legacy telephony equipment 105, for example using custom brackets which may be of a quick-release, boltless design.

In some embodiments, the telephony equipment migration module 135 is mounted in or on cable trays that are provided above the racks. The telephony equipment migration module 135 may be mounted using quick removal clamps and the specific mounting hardware may be customisable to particular racks without changing other parts of the telephony equipment migration module 135.

In some embodiments, the telephony equipment migration module 135 is fixed to one or more mounts 150, such as brackets, which are fitted on top of existing cable trays. The telephony equipment migration module 135 is bolted to the mounts 150 through existing holes in the side flanges of the telephony equipment migration module 135 that are used to bolt the telephony equipment migration module 135 to the rack. In some embodiments, the telephony equipment migration module 135 is bolted to brackets that clamp over the lip of an existing cable tray. The telephony equipment migration module 135 may alternatively be provided below the racks or behind or in front of the racks on extension elements.

One or more flat strips or washers may be provided underneath the telephony equipment migration module 135 for rigidity. The telephony equipment migration module 135 may be mounted with its connectors facing outwards, bolted onto the front of the brackets, so that the weight of the telephony equipment migration module 135 rests on top of the cable tray. For different cable trays, the mounts may need to be redesigned to be mountable on the cable tray. However, the telephony equipment migration module 135 itself need not be redesigned if the mounts are securable to the telephony equipment migration module 135, for example using the side flanges.

A method of migrating telephony equipment will now be described. The method may be performed using a telephony equipment migration arrangement as described herein.

At least one telephony equipment migration module 135 is provided. At least one transport cable 115 is connected to the at least one telephony equipment migration module 135. At least one coupling cable 140 is connected to the at least one telephony equipment migration module 135 and to the legacy telephony equipment 105. At least one coupling cable 125 is connected to the at least one telephony equipment migration module 135 and to the replacement telephony equipment 110. The replacement telephony equipment 110 is tested using at least the at least one telephony equipment migration module 135.

The replacement telephony equipment 110 is then activated. The replacement telephony equipment 110 may be activated via the telephony equipment migration module 135. Activation, in this sense, may comprising cutting all of the traffic that was previous being communicated to/from the legacy telephony equipment 105 to/from the replacement telephony equipment 110.

In more detail, a process of cutover from the legacy telephony equipment 105 to the replacement telephony equipment 110 may be performed as follows.

The control system and the power and networking infrastructure are installed. This is followed by basic testing. Management interfaces to the legacy telephony equipment 105 and the replacement telephony equipment 110 are defined. This includes an initial import of mapping records, followed by basic testing. One or more telephony equipment migration modules 135 are then installed. The connection to the control servers is tested and a self-test of the relay function of the telephony equipment migration module 135 is performed. One or more remote coupling cables 125 are installed from the replacement telephony equipment 110 to the telephony equipment migration module 135. The telephony equipment migration module 135 is inserted into the path of the existing transport connections on a module-by-module basis, possibly using appropriate personality cables.

As explained above, the at least one telephony equipment migration module 135 comprises one or more legacy telephony equipment connectors 137 for transmitting transport signals to and receiving transport signals from the legacy telephony equipment 105 and one or more replacement telephony equipment connectors 138 for transmitting transport signals to and receiving transport signals from the replacement telephony equipment 110. The at least one telephony equipment migration module 135 also comprises one or more controllers operable to control switching between transport signals being transmitted to the legacy telephony equipment 105 or transport signals being transmitted to the replacement telecommunication switch and transport signals being received from the legacy telephony equipment 105 or transport signals being received from the replacement telecommunication switch. The control module is operable to switch from transport signals being received from the legacy telephony equipment 105 to transport signals being received from the replacement telecommunication switch, while transport signals are being transmitted to the legacy telephony equipment 105. The control module is also operable to switch from transport signals being transmitted to the legacy telephony equipment 105 to transport signals being transmitted to the replacement telecommunication switch, while transport signals are being received from the legacy telephony equipment 105.

The control system performs some or all of the following steps to allow full testing of the correct insertion of the telephony equipment migration modules 135.

As a first step, with the transmit and receive switches or relays in the legacy telephony equipment 105 position, the legacy telephony equipment 105 transmitter enabled and the replacement telephony equipment 110 transmitter disabled, the control system verifies that there are no alarms on the given circuit at the legacy telephony equipment 105 and that there is Loss of Signal (LOS) at the replacement telephony equipment 110.

As a second step, the receive relay is moved to the replacement telephony equipment 110 position and the control system verifies that the legacy telephony equipment 105 detects LOS and that the replacement telephony equipment 110 achieves frame lock.

As a third step, the transmit relay is moved to the replacement telephony equipment 110 position and the control system verifies that the legacy telephony equipment 105 is still detecting LOS and that the replacement telephony equipment 110 now shows a Remote Defect Indicator (RDI) or blue alarm.

As a fourth step, the replacement telephony equipment 110 transmitter is enabled and the control system verifies that the legacy telephony equipment 105 is still detecting LOS but that the alarms on the replacement telephony equipment 110 port clear, and that there are no slips, Bipolar Violations (BPVs) or other coding errors.

As a fifth step, both relays are moved back to the legacy telephony equipment 105 position and the control system verifies that the legacy telephony equipment 105 alarms clear and that the replacement telephony equipment 110 shows LOS.

Thus, to minimise disruption, as each telephony equipment migration module 135 is re-cabled, the control system exercises the relays in combination with communicating with the legacy telephony equipment 105 and the replacement telephony equipment 110, to verify the correct cabling and end-to-end function. With all cabling complete, the mapping records are updated, the state of all carriers queried to identify carriers that have failed for external reasons, and then a final test is carried out to verify the wiring.

The cut is then undertaken by flipping all of the relays in the telephony equipment migration module 135 to the legacy telephony equipment 105 position, with the control system querying all carrier states afterwards to verify success.

In the event of failure, the cut can quickly be reversed.

In the event of success, after a suitable period of bedding in, the telephony equipment migration module 135 can be removed during a maintenance window. In some embodiments, the remote coupling cable 125 may be directly connected to the transport personality cables or the transport cables 115 themselves. The status of the replacement telephony equipment 110 may be verified via the control system.

The at least one transport cable 115 is decoupled from the at least one telephony equipment migration module 135 and the at least one remote coupling cable 125 is also decoupled from the at least one telephony equipment migration module 135. The at least one transport cable 115 and the at least one remote coupling cable 125 are then communicatively coupled together. The personality cables for connecting the legacy telephony equipment 105 to the telephony equipment migration modules 135, the telephony equipment migration modules 135, the network and power infrastructure and control servers can then be reused, for example for future migrations. The telephony equipment migration modules 135 may be removed, for example for use in another telephony equipment migration.

As explained above, a sudden cut migration may be achieved to minimise impact on the rest of the network. Furthermore, migration may be simple and cheap to deploy, both in terms of hardware cost and physical process. A large degree of pre-testing may be supported to ensure that the cut proceeds cleanly. An easy backout may be provided in case of problems. The impact to the long-term reliability of the replacement telephony equipment 110 need not be adversely affected. Finally, migration can be customised to different telephony equipment types.

Figure 4:
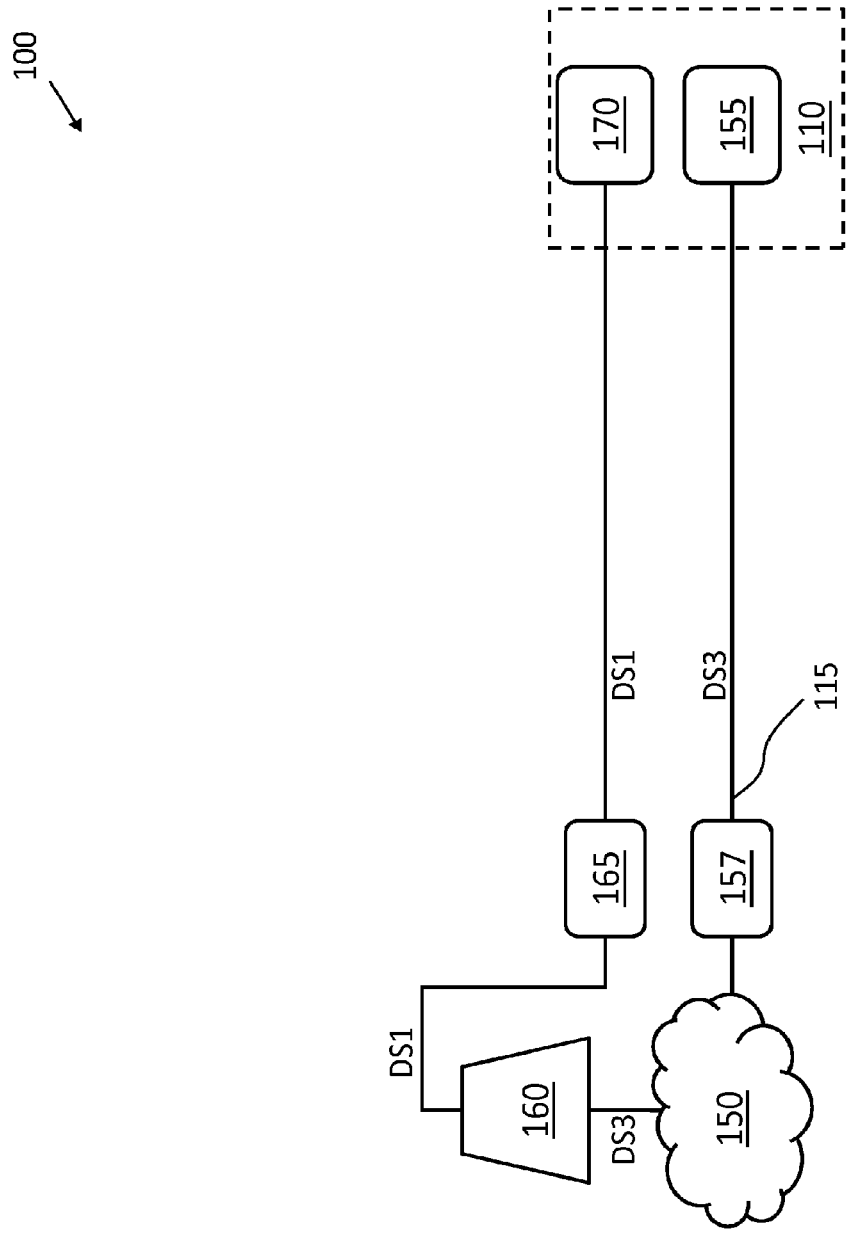
FIG. 4 is a schematic representation of a telephony system prior to telephony equipment migration.

FIG. 4 is a schematic representation of a telephony system 100 prior to telephony equipment migration.

In this telephony system 100, a site is shown that includes a CLASS 4 switch; legacy telephony equipment 110.

The CLASS 4 switch is not VoIP capable and it may be desired to migrate the CLASS 4 switch to a more modern platform, replacement telephony equipment 105, which still captures the existing function of the CLASS 4 switch. Signalling may be ported from the CLASS 4 switch to a more modern signalling platform and the media may be handled via high function H.248 media gateways, such as Next Generation Media Gateways (NGMGs).

As explained above, one option would be to migrate circuit by circuit to replacement telephony equipment 105 which is run in parallel with the legacy CLASS 4 switch 110, with circuits migrated over one-by-one over a long period of time. However, this is an expensive and time-consuming process and it is quite possible that inaccuracies would be introduced into transport cabling records as part of the migrations. As explained below, hardware that offers a flash cut migration and which enables the transport cable connectors 120 at the CLASS 4 switch 110 end to remain in substantially the same location, may greatly reduce migration effort, result in a much higher migration rate, and may reduce the risk of inaccuracies in transport cabling records. The distribution of switch ports on the new switch, using remote coupling cables, can also be made to match the distribution of switch ports on the old switch, allows the cabling records to be entirely unchanged.

The telephony system 100 comprises a transport network 150.

A number of DS3 transport cables connect a DS3 termination frame or interface 155 of the CLASS 4 switch 110 to the transport network 150. This connection is via a Digital Signal Cross-connect (DSX)-3 arrangement 157 which provides temporary or permanent cross connections between network elements on both of its sides. The DS3 termination frame 155 may include two bays which each terminate six DS3s.

One or more signal processing elements (not shown) may also be included in the signal path between the transport network 150 and the DS3 termination frame 155.

A number of transport cables (a combination of DS3 and DS(X-)1 cables) also connect a DS1 termination frame or interface 170 of the CLASS 4 switch 110 to the transport network 150. The DS1 termination frame 170 may be made up of, for example, three bays, where two of the bays each terminate 80 DS1s.

In more detail, DS3 transport cables provide connectivity from the transport network 150 to a multiplexer 160 which multiplexes DS3 and DS1s. DS1 (or DSX-1) cables connected at one end to the multiplexer 160 connect at their other end to a Digital Signal Cross-connect (DSX)-1 arrangement 165, which serves the same purpose as the above-described DSX-3 arrangement 157. One or more signal processing elements (not shown) may also be included in the signal path between the transport network 150 and the DS1 termination frame 170.

The shield of the cables that connect the DSX-1 arrangement 165 to the DS1 termination frame 170 is grounded at the DSX-1 arrangement 165 end, whereas the connectors at the DS1 termination frame 170 end float.

Figure 5:
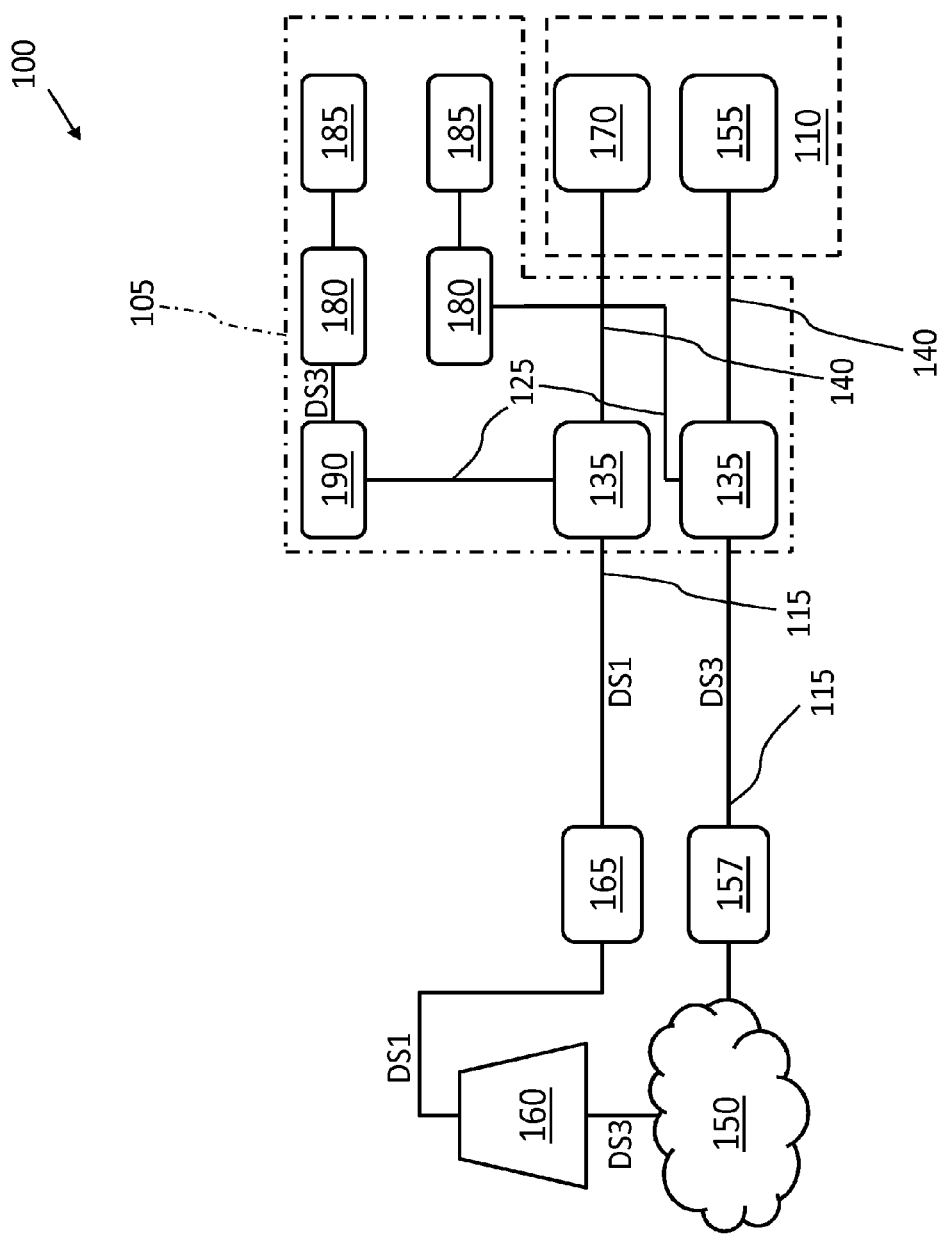
FIG. 5 is a schematic representation of a telephony system during telephony equipment migration in accordance with some embodiments.

FIG. 5 is a schematic representation of a telephony system 100 during telephony equipment migration in accordance with some embodiments.

The telephony equipment migration arrangement includes a plurality of DS3 breakout panels 180 which provide DS3 interfaces to several NGMGs 185. Bulk termination of DS1s via DS3 breakout panel 180 is provided via one or more ultra-high density M13 multiplexers 190. An example of such a multiplexer is the Adtran™ MX2820 multiplexer, in which nine DS3s and 252 DS1s may be terminated per 2 U of a 23" rack. The DS1s may thus connect to full density DS3 interfaces on the DS3 breakout panels 180 via the one or more multiplexers 190. The NGMG multiplexers 190 may be fully integrated into the NGMG management, via flow through configuration and status. In other words, NGMG management tools may accept configuration information and transfer it to the NGMG multiplexers 190 so that the user does not have to separately manage the NGMG multiplexers 190.

A plurality of telephony equipment migration modules 135 are connected just in front of the DS3 and DS1 termination frames 155, 170. Locating the telephony equipment migration modules 135 just in front of the DS3 and DS1 termination frames 155, 170 limits the rewiring effort for migration and avoids or significantly reduces the need for changes to cable records following migration. Some of the telephony equipment migration modules 135 provide DS1 termination and others provide DS3 termination. The telephony equipment migration modules 135 allow onward connections to both the CLASS 4 switch 110 and the NGMGs 185 via appropriate cables and possibly adaptors.

The telephony equipment migration modules 135 include relays that allow signal switching between the CLASS 4 switch 110 and the NGMGs 185 and the ability to test new links as they are connected. Once ready, the NGMGs 185 may be activated and all traffic can be diverted from the CLASS 4 switch 110 to the NGMGs 185. The cut may be completed in short timescales, possibly in less than one minute. Equally quick reversion is possible in the event of any problems during the cut.

During migration, the existing transport cables 115 are disconnected from the DS3 and DS1 termination frames 155, 170 reconnected to the telephony equipment migration modules 135. Temporary jumpers 140 connect the telephony equipment migration modules 135 to the DS3 and DS1 termination frames 155, 170 during the migration. Remote coupling cables 125 connect the telephony equipment migration modules 135 to the NGMGs 185. The telephony equipment migration modules 135 control signal routing; to the CLASS 4 switch 110 pre-cut and to the NGMG 185 during testing and post-cut.

After the cut, the transport cable 115 and the remote coupling cable 125 (to the NGMGs) may be directly or indirectly connected to each other and the telephony equipment migration modules 135 may be removed. This allows a cost reduction for the migration by recovering most of the migration hardware and increases long-term reliability. At any time after the cut (or never), the legacy CLASS 4 switch 110 may be removed, for example to free up physical space. Minimal extra wiring effort is required if cable trays are left in place. More significant rewiring allows the whole floor space to be freed up.

Migration of the DS1 termination frame 170 will now be explained.

Various cables are provided for the migration.

One or more transport personality cables are provided that include appropriate connectors at one end for mating with the connectors 120 on the DSX-1/transport cables 115 and appropriate connectors at the other end for connection to transport cable connectors 136 on the telephony equipment migration module 135.

One or more legacy telephony equipment personality cables are also provided that include connectors at one end that are similar to the connectors 120 on the transport cables 115 (to connect to the DS1 termination frame 155) and appropriate connectors at the other end for connection to legacy telephony equipment connectors 137 on the telephony equipment migration module 135.

One or more remote coupling cables 125 are also provided which include appropriate connectors at one end to connect to the multiplexer 190 and appropriate connectors 130 at the other end to connect to the replacement telephony equipment connectors 138 on the telephony equipment migration module 135. The connectors on the telephony equipment migration module 135 end may be directly couplable with the connectors on the telephony equipment migration module 135 of the transport cable personality cables. This is so that, after migration, the remote coupling cables 125 can be directly connectors to the connectors 120 on the transport personality cables, allowing removal of the telephony equipment migration module 135.

The remote coupling cable connectors 130 at the telephony equipment migration module 135 end are effectively the demarcation point between existing transport runs and the replacement telephony equipment 105. The long-term presence of these connectors 130 in a predetermined location relative to the DS1 termination frame 170 means that existing cable records for the DSX-1 (transport) cables remain valid.

The transport personality cables and the legacy telephony equipment personality cables may be relatively short, for example less than 6 ft (approximately 1.8 m) in length, and may be unshielded.

In terms of the grounding of shields for the remote coupling cables 125, in current DSX-1 transport cables, shields are grounded at the DSX-1 arrangement 165 and the connectors float at the DS1 termination panel 155 end. It is not possible to extend shielding to the multiplexer 190 after the telephony equipment migration module 135 is removed. The remote coupling cable shields are thus grounded at the multiplexer 190 end and the connectors 130 are floated at the telephony equipment migration module 135 end.

To avoid cable length issues, the multiplexers 190 are located sufficiently close to the DSX-1 arrangement 165 that the total DSX-1 arrangement 165 to multiplexer 190 cable length is within the normal signal loss budget.

Line build Out (LBO) is the process attenuating the output of a transmitter to reduce the power delivered to the line, such that the signal level at a predefined distant point (normally the DSX panel arrangement 165) is within a predefined range. Specifically, if the transmitter power is correct for the maximal line length, an attenuator needs to be included if the signal level is not to be excessively high when a very short cable is used. Ideally, the multiplexers 190 should be located close enough to the DSX-1 arrangement 165 that the line build out does not need to be changed.

Multiplexer 190 to NGMG breakout panel 180 signals are unlikely to be a limiting factor. This is because DS3 cables which connect the multiplexer 190 to the NGMG breakout panel 180 can be up to a normal 900 ft (approximately 274 meters) in length and Ethernet cables may be up to a standard 100 m in length.

Migration of the DS3 termination frame 170 will now be explained.

Each DS3 termination frame bay terminates six DS3s. Connections to the DS3 termination frame 170 are via standard BNC connectors onto little daughter cards. In some embodiments, the telephony equipment migration modules 135 use the same, BNC, connectors.

Connections to the DS3 termination frame 170 from the telephony equipment migration module 135 may be made via short, in-bay, BNC jumper cables 140. One end of the jumpers 140 is attached to the telephony equipment migration module 135. The other end of the jumpers 140 drops into the DS3 termination frame bays down an existing cable duct. The jumpers 140 mate with the BNCs on the existing daughter boards.

One option for connecting the existing transport cables 115 to the telephony equipment migration module 135 is to untie the existing transport cables 115, pull them up the existing cable duct and then directly connect them to the telephony equipment migration modules 135. This option is particularly clean if the eventual desire is to remove the DS3 termination frame hardware while leaving existing cable trays in place.

Another option for connecting the existing transport cables 115 to the telephony equipment migration module 135 is to drop a second set of jumpers down the existing cable duct, with the free end of the jumpers mating with the existing connectors 120 on the transport cables 115. This option is relatively quick and allows line mounted BNC connectors to be tied into existing cable management bars.

The remote coupling cables 125 for connecting the DS3 telephony equipment migration module 135 to the NGMG breakout panel 180 terminates in standard BNC connectors at both ends. During migration, one end of the remote coupling cables 125 is connected to replacement telephony equipment connectors 138 on the DS3 telephony equipment migration module 135 and the other end is connected to the DS3 NGMG breakout panel 180.

In terms of the grounding of shields, at the telephony equipment migration modules 135, the BNCs are isolated from the local ground. Shields of each group of the three associated transport cables 115, legacy telephony equipment coupling cables 140 and the remote coupling cables 125 are cross-connected.

In terms of the grounding of shields, at the NGMG breakout panel 180, all of the BNCs are isolated from the local ground. Signals are transformer-coupled (for example by an isolation transformer) and high-frequency noise on the shield is bypassed to the local ground via an isolating capacitor.

After migration, the DS3 transport cables 115, which terminate with BNC connectors at the DS3 telephony equipment migration module 135 end, and the remote coupling cables 125, which also terminate with BNC connectors at the DS3 telephony equipment migration module 135 end, are directly connected to each other using BNC joiners or other types of adaptor. The transport cables 115 and the remote coupling cables 125 may be left in the cable tray of the DS3 termination frame enclosure or may be left within the DS3 termination frame enclosure itself.

The BNC connectors 130 on these remote coupling cables 125 are effectively the demarcation point between the existing DS3 transport runs and the NGMG 185. The long-term presence of these connectors 130 at each DS3 termination frame bay means that existing cable records for the DS3 transport cables 115 remain valid.

To avoid cable length issues, the NGMGs 185 may be located so that total cable length between the transport cables 115 and the NGMGs 185 (possibly via the telephony equipment migration modules 135) is within the normal signal loss budget.

As described above, the CLASS 4 switch 110 and NGMG 185 are communicatively coupled, with intermediate switching provided by the telephony equipment migration module 135. Carrying out migration in this way may be low cost, provides reliable operation, enables efficient matching of channel counts and may also provide flexible mounting options.

Figure 6:
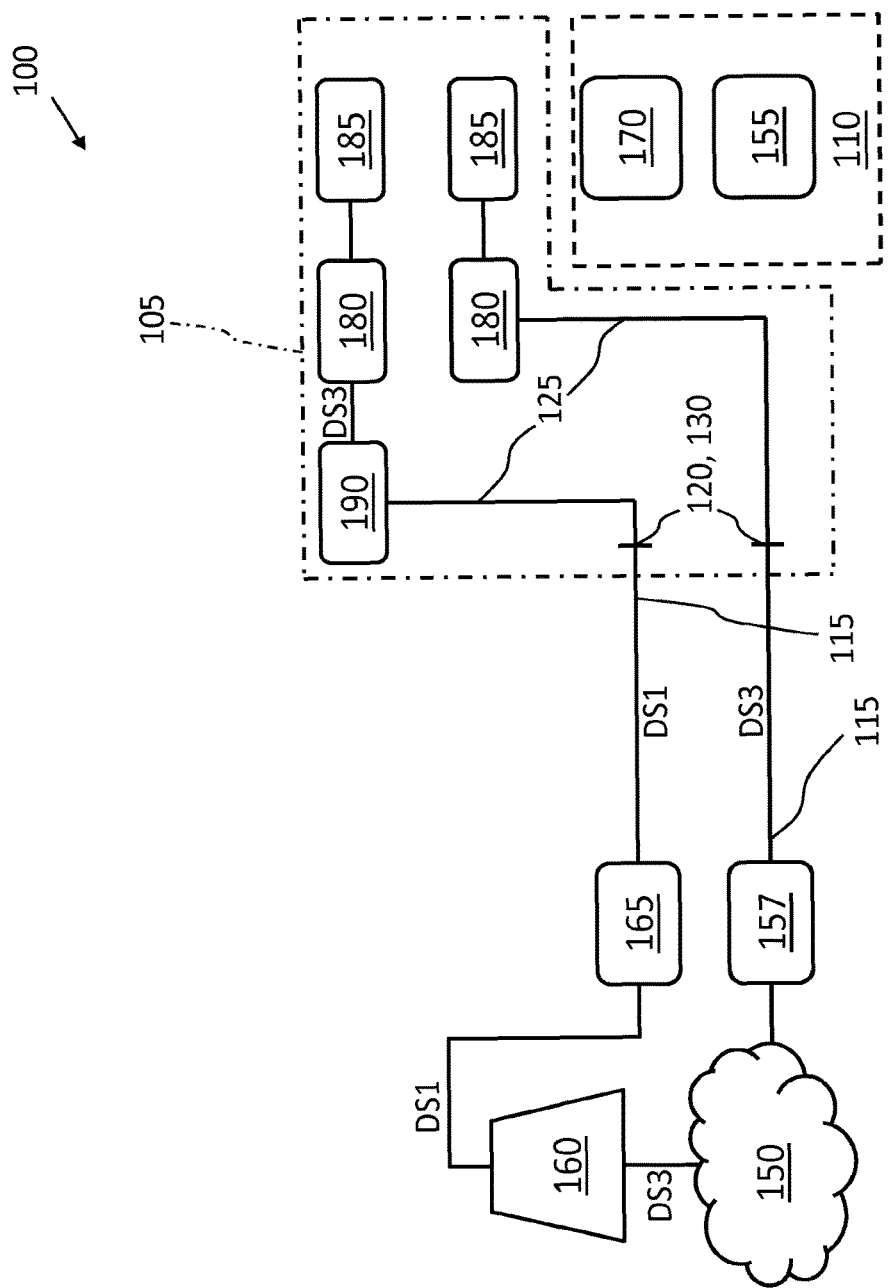
FIG. 6 is a schematic representation of a telephony system after telephony equipment migration in accordance with some embodiments.

FIG. 6 is a schematic representation of a telephony system 100 after telephony equipment migration in accordance with some embodiments.

After migration, the existing transport cables 115 are directly or indirectly connected to the remote coupling cables 125 that connected the NGMG breakout panels 180 to the telephony equipment migration modules 135 during migration. The telephony equipment migration modules 135 and the jumpers 140 have been removed for reuse. The legacy telephony equipment 110 is retired in-situ or may be removed.

Figure 7:
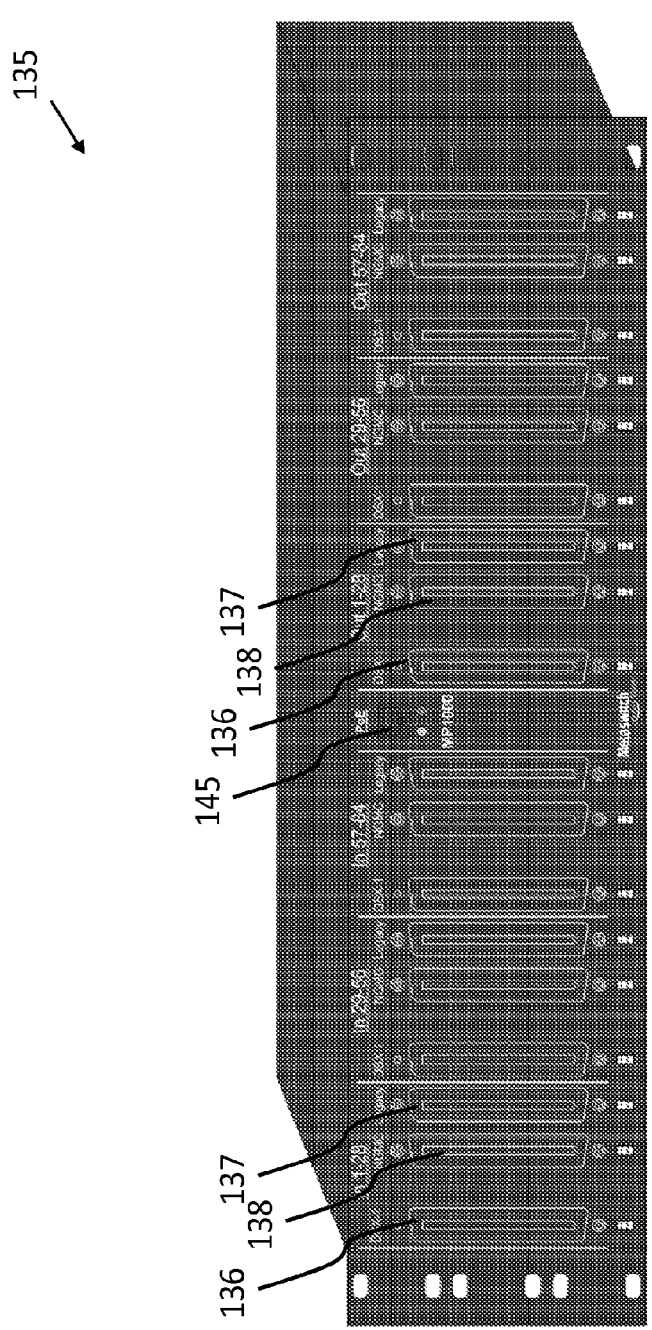
FIG. 7 is a perspective view of a telephony equipment migration module in accordance with some embodiments.

FIG. 7 is a perspective view of a telephony equipment migration module 135 in accordance with some embodiments.

The telephony equipment migration module 135 depicted in FIG. 7 is in the form of a legacy DS1 migration panel. The legacy DS1 migration panel is a 3 U 23" unit that switches up to eighty-four DS1s. The telephony equipment migration module 135 includes a power and control interface 145 such that it can be controlled over a PoE connection. The telephony equipment migration module 135 is readily removable after migration. The telephony equipment migration module 135 may be approximately 125 mm deep and its top and rear faces may be easily removable, for ease of access.

Inside the telephony equipment migration module 135, the connectors 136, 137, 138 are attached to passive midplane. Only active components are entirely non-critical. The telephony equipment migration module 135 comprises status LEDs and its serial number may be stored in Serial Electrically Erasable Programmable Read Only Memory (SEEPROM). Active components on the midplane (i.e. those with silicon elements which could in theory fail), are such that their failure is non-critical. For example, an LED which fails to display or a serial EEPROM which does not report a serial number may be an inconvenience, but the failure does not cause any impact on the signals passing through the telephony equipment migration module 135.

The telephony equipment migration module 135 includes relays or bypass functionality and input/output (I/O) circuitry on replaceable boards; for example using six relays or bypass cards and one I/O card. The telephony equipment migration module 135 uses connectors which are the same as those in existing DS1 termination frame bays and are strongly self-aligning and do not require retainers. Given the potentially temporary nature of the telephony equipment migration module 135, requirement for field replacement are relatively low. The telephony equipment migration module 135 is cased in a standard 3 U 23" panel, which offers flexibility in terms of mounting options.

The telephony equipment migration module s 135 may include manufacturer-provided firmware which offers a simple Internet Protocol (IP) interface to the telephony equipment migration module 135. This may be used to retrieve the serial number of the telephony equipment migration module 135, to confirm the presence of replaceable elements, to light a "Locate" LED to verify physical/logical mappings, to retrieve a current relay status and/or to control the relays or other switching hardware. IP configuration may be via port-based DHCP from information on the switches.

Figure 8:
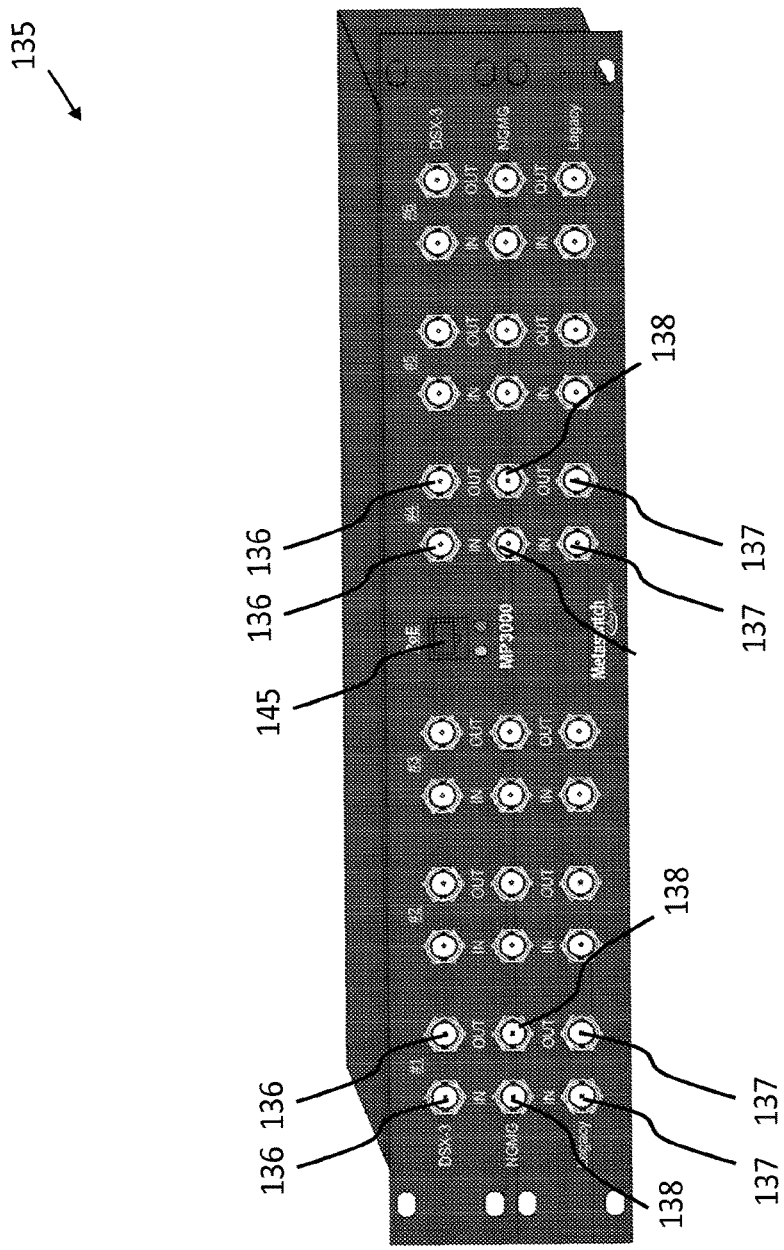
FIG. 8 is a perspective view of a telephony equipment migration module in accordance with some embodiments.

FIG. 8 is a perspective view of a telephony equipment migration module 135 in accordance with some embodiments.

The telephony equipment migration module 135 depicted in FIG. 8 is in the form of a DS3 termination frame migration panel, although it may be used for other types of migration. The DS3 termination frame migration panel is in the form of a 2 U 19" unit that switches up to six DS3s. The telephony equipment migration module 135 includes a power and control interface 145 such that it can be controlled over a PoE connection. The telephony equipment migration module 135 may be approximately 100 mm deep and its top and rear faces may be easily removable. The telephony equipment migration module 135 comprises various features in common with the telephony equipment migration module 135 described above in relation to FIG. 8 and repeated explanation of such features is therefore omitted.

The telephony equipment migration module 135 may comprise a semi-passive midplane and I/O circuitry. The external connectors 136, 137, 138 are attached to the semi-passive midplane. The I/O circuitry may be provided on a hot-swappable board The telephony equipment migration module 135 may be cased in a standard 2 U 19" panel, which offers flexibility in terms of mounting options.

The above embodiments are to be understood as illustrative examples of the invention. Further embodiments of the invention are envisaged.

For example, although embodiments have been described in which the telephony equipment migration modules 135 are located in, on or under the same rack as the legacy telephony equipment 105, they could instead be located in, on or under the same rack as the replacement telephony equipment 110. In this case, extension cables could be run from the transport cables 115 that are located in the predetermined location to the telephony equipment migration modules 135, with coupling cables running back to the legacy telephony equipment and coupling cables running to the replacement telephony equipment 110.

In some embodiments, the power and control interface or port 145 is described as being suitable for PoE. In other embodiments, it may be an RS422 interface with power.

In some embodiments described above, the telephony equipment migration module 135 is securable to a telephony equipment rack. In other embodiments, the telephony equipment migration module 135 may be placed on the floor or secured to a nearby wall instead of being secured to the rack itself.

An aspect in relation to the invention provides a telephony equipment migration module, comprising:
one or more transport cable connectors;
one or more legacy telephony equipment connectors for transmitting transport signals to and receiving transport signals from legacy telephony equipment; and
one or more replacement telephony equipment connectors for transmitting transport signals to and receiving transport signals from replacement telephony equipment.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A telephony equipment migration arrangement to facilitate migration from legacy telephony equipment to replacement telephony equipment, the arrangement comprising:
the legacy telephony equipment located in one or more equipment bays including at least a first equipment bay;
at least one transport cable having one or more connectors, the at least one transport cable providing external carrier connectivity;
the replacement telephony equipment located in one or more equipment bays remote from the legacy telephony equipment; and
at least one remote coupling cable connected to the replacement telephony equipment and comprising one or more connectors,
wherein the one or more connectors of the remote coupling cable are mounted in a location having a predetermined locational relationship with the first equipment bay in which the legacy telephony equipment is located,
wherein the at least one transport cable is communicatively coupled to the at least one remote coupling cable, and
wherein the at least one remote coupling cable extends from the replacement telephony equipment to the location having the predetermined locational relationship with the first equipment bay in which the legacy telephony equipment is located to enable the one or more connectors of the at least one remote coupling cable to be mounted in said location.

2. The arrangement of claim 1, comprising at least one telephony equipment migration module via which the at least one transport cable and the at least one remote coupling cable are communicatively couplable, the at least one telephony equipment migration module comprising:
one or more transport cable connectors that are communicatively couplable to the one or more connectors of the at least one transport cable; and
one or more replacement telephony equipment connectors that are communicatively couplable to the one or more connectors of the at least one remote coupling cable.

3. The arrangement of claim 2, wherein the at least one telephony equipment migration module is located in one or more equipment bays in the location having the predetermined locational relationship with the first equipment bay in which the legacy telephony equipment is located.

4. The arrangement of claim 2, wherein the one or more replacement telephony equipment connectors are configured to transmit transport signals to and receive transport signals from the replacement telephony equipment and wherein the at least one telephony equipment migration module comprises:
one or more legacy telephony equipment connectors configured to transmit transport signals to and receive transport signals from the legacy telephony equipment;
one or more controllers operable to control switching between:
transport signals being transmitted to the legacy telephony equipment or transport signals being transmitted to the replacement telephony equipment; and
transport signals being received from the legacy telephony equipment or transport signals being received from the replacement telephony equipment.

5. The arrangement of claim 4, wherein the one or more controllers are configured to default to transport signals being transmitted to the legacy telephony equipment and transport signals being received from the legacy telephony equipment.

6. The arrangement of claim 4, wherein the at least one telephony equipment migration module comprises:
one or more relays that are controllable to switch between transport signals being transmitted to the legacy telephony equipment or transport signals being transmitted to the replacement telephony equipment; and
one or more relays that are controllable to switch between transport signals being received from the legacy telephony equipment or transport signals being received from the replacement telephony equipment.

7. The arrangement of claim 6, wherein at least some of the one or more relays comprise latching relays.

8. The arrangement of claim 2, wherein at least one of the one or more transport cable connectors of the at least one telephony equipment migration module is directly connectable to the one or more connectors of the at least one transport cable.

9. The arrangement of claim 2, wherein at least one of the one or more transport cable connectors of the at least one telephony equipment migration module is not directly connectable to the one or more connectors of the at least one transport cable, the arrangement comprising:
one or more adaptors comprising:
one or more transport cable connectors that are directly connected to the one or more connectors of the at least one transport cable; and
one or more connectors that are directly connectable to the one or more transport cable connectors of the at least one telephony equipment migration module and are directly connectable to the one or more connectors of the at least one remote coupling cable,
whereby the at least one transport cable is indirectly connectable to the at least one telephony equipment migration module via the one or more adaptors.

10. The arrangement of claim 2, wherein at least one of the one or more replacement telephony equipment connectors of the at least one telephony equipment migration module is directly connectable to the one or more connectors of the at least one remote coupling cable.

11. The arrangement of claim 2, comprising one or more telephony equipment migration module mounts, the one or more telephony equipment migration module mounts being securable to a rack in which the first equipment bay is located and to the at least one telephony equipment migration module.

12. The arrangement of claim 1, wherein the one or more connectors of the at least one remote coupling cable are directly connectable to the one or more connectors of the at least one transport cable.

13. The arrangement of claim 1, wherein the predetermined locational relationship comprises the one or more connectors of the remote coupling cable being mounted in a location in the vicinity of the first equipment bay or being mounted in the location of the first equipment bay.

14. The arrangement of claim 1, wherein the at least one transport cable is communicatively coupled to the legacy telephony equipment.

15. The arrangement of claim 1, wherein the replacement telephony equipment comprises a new generation telephony equipment which supersedes the legacy telephony equipment.

16. The arrangement of claim 1, wherein the legacy telephony equipment comprises one or more legacy telephony switches and wherein the replacement telephony equipment comprises one or more replacement telephony switches.

17. A method of migrating telephony equipment to facilitate migration from legacy telephony equipment to replacement telephony equipment, the arrangement, the method comprising:
providing at least one telephony equipment migration module;
connecting at least one transport cable to the at least one telephony equipment migration module, the at least one transport cable providing external carrier connectivity;
connecting at least one coupling cable to the at least one telephony equipment migration module and to the legacy telephony equipment;
connecting at least one remote coupling cable to the at least one telephony equipment migration module and to the replacement telephony equipment,
testing the replacement telephony equipment using at least the at least one telephony equipment migration module; and
activating the replacement telephony equipment,
wherein the one or more connectors of the remote coupling cable are mounted in a location having a predetermined locational relationship with the first equipment bay in which the legacy telephony equipment is located,
wherein the at least one transport cable is communicatively coupled to the at least one remote coupling cable, and
wherein the at least one remote coupling cable extends from the replacement telephony equipment to the location having the predetermined locational relationship with the first equipment bay in which the legacy telephony equipment is located to enable the one or more connectors of the at least one remote coupling cable to be mounted in said location.

18. The method of claim 17, wherein said activating comprises activating the replacement telephony equipment via the telephony equipment migration module.

19. The method of claim 17, wherein the at least one telephony equipment migration module comprises:
one or more legacy telephony equipment connectors configured to transmit transport signals to and receive transport signals from the legacy telephony equipment;
one or more replacement telephony equipment connectors configured to transmit transport signals to and receive transport signals from the replacement telephony equipment; and
one or more controllers operable to control switching between:
transport signals being transmitted to the legacy telephony equipment or transport signals being transmitted to the replacement telephony equipment; and
transport signals being received from the legacy telephony equipment or transport signals being received from the replacement telephony equipment.

20. The method of claim 19, comprising:
operating the one or more controllers to switch from transport signals being received from the legacy telephony equipment to transport signals being received from the replacement telephony equipment, while transport signals are being transmitted to the legacy telephony equipment; and/or
operating the one or more controllers to switch from transport signals being transmitted to the legacy telephony equipment to transport signals being transmitted to the replacement telephony equipment, while transport signals are being received from the legacy telephony equipment.

21. The method of claim 17, comprising:
decoupling the at least one transport cable from the at least one telephony equipment migration module;
decoupling the at least one remote coupling cable from the at least one telephony equipment migration module; and
communicatively coupling the at least one transport cable to the at least one remote coupling arrangement.

22. The method of claim 17, comprising extending the at least one remote coupling cable from the replacement telephony equipment to a location having a predetermined locational relationship with a location of the legacy telephony equipment to enable the one or more connectors of the at least one remote coupling cable to be mounted in said location having the predetermined locational relationship.

23. A telephony equipment migration module, comprising:
one or more transport cable connectors;
one or more legacy telephony equipment connectors configured to transmit transport signals to and receive transport signals from legacy telephony equipment;
one or more replacement telephony equipment connectors configured to transmit transport signals to and receive transport signals from replacement telephony equipment; and
one or more controllers operable to control switching between:
transport signals being transmitted to the legacy telephony equipment or transport signals being transmitted to the replacement telephony equipment; and
transport signals being received from the legacy telephony equipment or transport signals being received from the replacement telephony equipment.

24. The telephony equipment migration module of claim 23, wherein the telephony equipment migration module is in location having a predetermined locational relationship with the legacy telephony equipment, and wherein the replacement telephony equipment is located remotely from the telephony equipment migration module and the legacy telephony equipment.

* * * * *